United States Patent
Lawrence et al.

(10) Patent No.: US 9,866,496 B2
(45) Date of Patent: Jan. 9, 2018

(54) METHODS AND SYSTEMS FOR ALLOCATING AND DE-ALLOCATING DELIVERY GROUPS ACROSS MULTIPLE SERVER FARMS

(71) Applicant: Citrix Systems, Inc., Fort Lauderdale, FL (US)

(72) Inventors: Christopher Lawrence, Fort Lauderdale, FL (US); Thomas M. Kludy, Cooper City, FL (US); Felipe Leon, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 154 days.

(21) Appl. No.: 14/566,553

(22) Filed: Dec. 10, 2014

(65) Prior Publication Data
US 2015/0163160 A1    Jun. 11, 2015

Related U.S. Application Data

(60) Provisional application No. 61/914,617, filed on Dec. 11, 2013.

(51) Int. Cl.
*H04L 12/911* (2013.01)
*G06F 9/50* (2006.01)

(52) U.S. Cl.
CPC ............ *H04L 47/70* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 2011/0004680 | A1* | 1/2011 | Ryman | G06F 9/4445 709/224 |
| 2012/0266166 | A1 | 10/2012 | Farkas et al. | |
| 2013/0031559 | A1* | 1/2013 | Alicherry | G06F 9/5077 718/104 |
| 2014/0032477 | A1* | 1/2014 | Trammel | G06F 9/5061 707/600 |

OTHER PUBLICATIONS

International Search Report and Written Opinion dated Mar. 25, 2015; PCT Application No. PCT/US2014/069610; 11 pages.

* cited by examiner

*Primary Examiner* — Angela Nguyen
(74) *Attorney, Agent, or Firm* — Fox Rothschild LLP; Robert J. Sacco; Carol E. Thorstad-Forsyth

(57) ABSTRACT

The embodiments are directed to methods and apparatuses for pairing delivery group machines with one or more server farms in computing networks. The methods and apparatus can allocate machines in a delivery group across one or more server farms in a manner that maximizes efficiency through better computer resource usage. The methods and apparatuses select a server farm having a largest available capacity, and allocate machines from a delivery group to the server farm. If the quantity of delivery group machines exceeds the server farm capacity, the remaining machines are allocated to a second server farm. The methods and appliances also provide for de-allocating server farms, by selecting a server farm with the least allocated capacity, and de-allocating one or more delivery group machines from the selected server farm to reduce the number of utilized server farms.

20 Claims, 7 Drawing Sheets

101a

Farm Spanning

| | |
|---|---|
| Delivery Group ID: | Las Vegas DG1 |
| Allocation mode: | Shared Delivery Group |
| Capacity: | 3 |

[Edit Capacity] [Delete] ⟲
← 160  ← 170  ← 180

| Session Machines 110 | Offerings 120 | Subscriptions 130 | Delivery Sites 140 | Users/Tenants 150 |
|---|---|---|---|---|

🔍 Search

| # Allocated | Name | Location | Isolation Mode |
|---|---|---|---|
| 2 | Farm Span 1 | Datacenter:Las Vegas DG1<br>Network:<br>Domain:eng.citriet.net | Shared |
| 1 | Farm Span 2 | Datacenter:Las Vegas DG1<br>Network:<br>Domain:eng.citriet.net | Shared |

Fig. 1B

METHODS AND SYSTEMS FOR ALLOCATING AND DE-ALLOCATING DELIVERY GROUPS ACROSS MULTIPLE SERVER FARMS

BACKGROUND

Personal computers were originally created for a single user, and encompassed one or more of the following: one or more operating systems, native and third party applications, user settings, etc. Now, however, the concept of virtualization has made it easier for organizations to provide similar computational functionality, without the cost of purchasing and maintaining individual personal computers. Virtualization allows users to interact with the operating system and applications stored therein in much the same way that they would a standalone personal computer. Desktop virtualization technology allows multiple instances of an operating system to be instantiated on one or more servers (e.g., server farms), thereby allowing multiple users to login to the server and complete the same tasks that they would, as if they had their own personal computer.

The architecture of the desktop virtualization environment is comprised of a collection of disparate networks. These networks can span floors in a building, or offices across several continents. The complexity of creating and maintaining these networks increases with the size of the network. Network administrators can spend weeks, if not months, properly configuring a network supporting a desktop virtualization environment.

In order to provide the services offered by a desktop in a virtual environment, server farms are selected to provide the applications and programs required by users connected to a server farm. Server farms are virtual instances of physical server farms. Therefore a group of machines (e.g., a delivery group) can be used to provide any necessary hardware and software for supporting the applications and programs requested by a user connected to a server farm. The current methods and systems for assigning machines from a delivery group to a server farm are limited to assigning one delivery group to a single server farm. A delivery group can contain more machines than are required by a server farm, and therefore extra machines assigned to a server farm may go unused, resulting in inefficient resource allocation.

BRIEF DESCRIPTION OF THE DRAWINGS

FIG. 1B is an exemplary view of a user portal interface, consistent with embodiments of the present disclosure.

DETAILED DESCRIPTION

In order to provide users with necessary resources in the most efficient way, delivery groups with adequate capacity are assigned to server farms with a corresponding capacity. This is normally accomplished by creating tables in databases that contain identifications of the server farms and the delivery groups, as well as the number of machines in a delivery group that are expected to be provided to a server farm. Current implementations only assign delivery groups with a capacity equal to the capacity of a server farm when assigning machines from a delivery group to a server farm. For example, if a server farm has the capacity to support 100 users, then a delivery group with the capacity to support 100 users would be assigned to the server farm. If, however, there is a delivery group with more capacity than a server farm, the delivery group will not be assigned to the server farm.

Disclosed embodiments provide mechanisms for dividing a delivery group into more than one delivery group (e.g., delivery group splitting or server farm spanning), and assigning the divided portions of a delivery group to a server farm with matching capacity, when the delivery group capacity exceeds the server farm capacity. The current disclosure provides the ability to fully utilize the number of machines a delivery group has to offer, via delivery group splitting or server farm spanning, and allowing new server farms to be paired with delivery groups that are already assigned to a server farm, but contain more capacity than the server farm.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

Figure 1A:
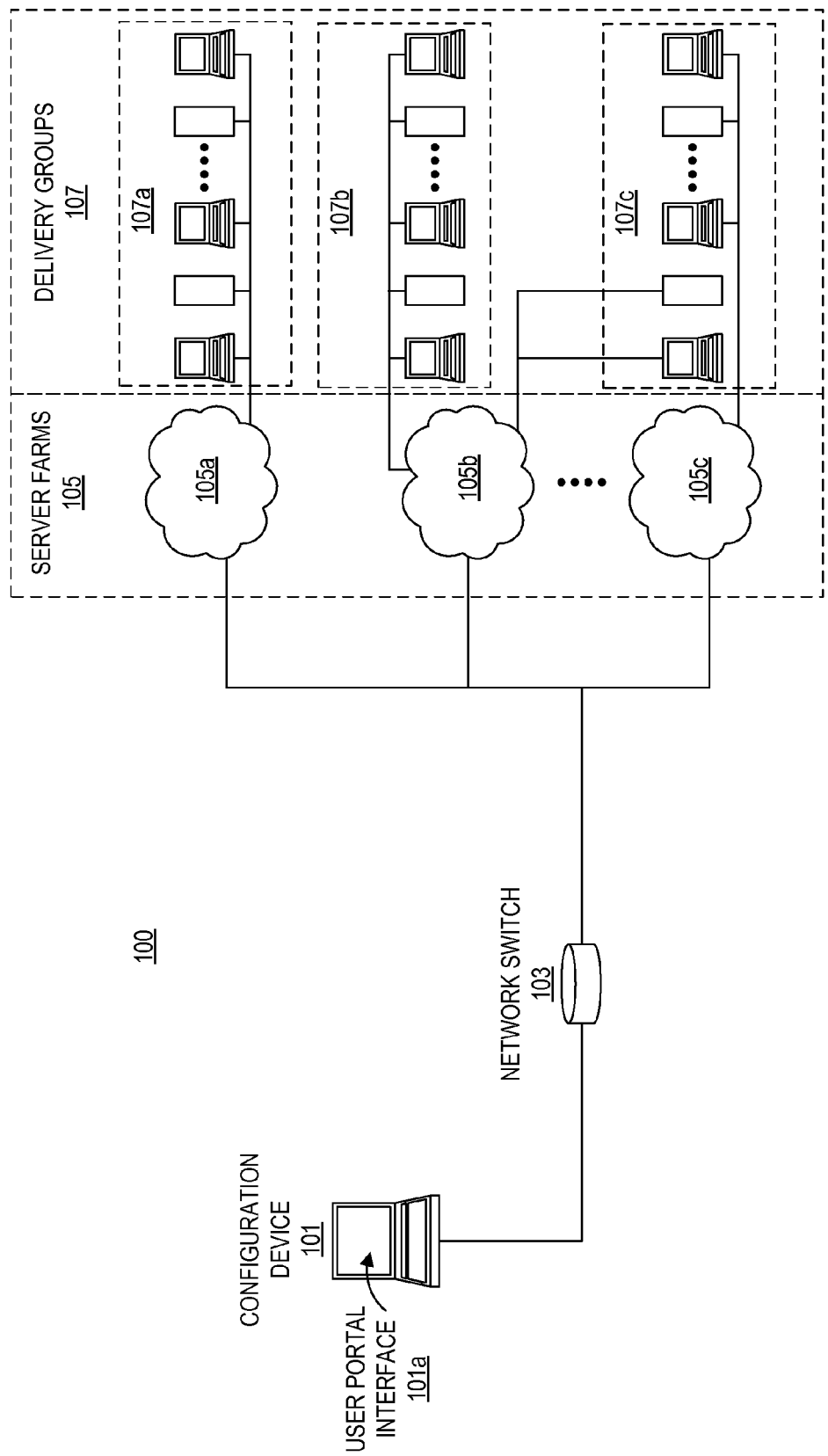
FIG. 1A is a network diagram of an exemplary system, consistent with embodiments of the present disclosure.

FIG. 1A is a network diagram of an exemplary system 100, consistent with embodiments of the present disclosure. System 100 represents any type of system capable of allocating and/or de-allocating delivery groups across multiple server farms. System 100 can include, in addition to other things, a configuration device 101, a network switch 103, one or more server farms 105, and one or more delivery groups 107.

Configuration device 101 is a computer program and/or terminal that can orchestrate configuration of system 100 by accessing and controlling different devices and applications in one or more server farms 105 or delivery groups 107. Configuration device 101 can have a computer program (user portal interface 101A) running on it that can add or remove server farms to a delivery group, or a portion of a delivery group. For example, configuration device 101 can de-allocate two machines from delivery group 107c that were originally assigned to server farm 105c, and reallocate the two machines to server farm 105b. Configuration device 101 can determine if server farm 105b has enough capacity to support the two machines being allocated to server farm 105b. If server farm 105b does not contain enough capacity to support the machines, configuration device 101 can either create another server farm, and assign the machines to the new server farm, or reassign the machines to another server farm with enough capacity (e.g., 105a). Moreover, configuration device 101 can define the allocation of delivery group machines across multiple server farms, which will further be described herein.

Network switch 103 may include a computer networking device or computer software module that connects devices on different networks. Network switch 103, for example, can be a server, network hub, repeater, network bridge, router, a layer-4 switch, or a layer-7 switch. Network switch 103 may receive messages from any device connected to it and transmit the message to the device or set of devices for which the message was intended. Network switch 103 can send and receive messages to the devices connected to it at layers 1, 2, 3, 4, and 7 of the Open Systems Interconnection (OSI) model. Network switch 103 can also send and receive messages using any combination of the different layers.

Server farms 105, such as server farms 105*a-c*, are collections of allocated machines assigned from delivery groups 107*a-c*, providing users with the ability to connect to applications (e.g., office suite products, instant messaging programs, video conferencing applications, etc.) provided by hardware and software running on the machines in the delivery groups. In some embodiments, server farms 105*a-c* can include one or more machines from a single delivery group. In some embodiments, server farms 105*a-c* can also include one or more machines from different delivery groups. For example, server farm 105*b* contains machines from delivery group B 107*b* and delivery group C 107*c*.

Delivery groups 107, such as delivery groups 107*a-c*, can include one or more machines such as desktop computers, databases, virtual databases, virtual desktops, and/or any other machine with a processor capable of providing applications requested by users connected to a server farm. The connections between server farms and the delivery groups can be comprised of a combination of wired and wireless networks.

FIG. 1B is an exemplary view of a user portal interface 101*a*, consistent with embodiments of the present disclosure. User portal interface 101*a*, can show one or more delivery group organized by datacenter, session machine catalog, mode of operation, capacity, and the domain that the delivery group belongs to. User portal interface 101*a* can also display multiple tabs including, but not limited to Session Machines 110, Offerings 120, Subscriptions 130, Delivery Sites 140, and Users/Tenants 150.

Session machines tab 110 can include a group of machines that are used by a server farm to provide desktop applications to users. Offerings tab 120 can include a listing of all programs (e.g., Excel, Skype, LaTeX) that can be hosted in a delivery group. Subscriptions tab 130 can include a list of subscriptions from tenants requesting services provided by one or more delivery group. Delivery sites tab 140 can include a list of different server farms, organized in ascending or descending order by health, name, location, and/or mode of operation. Users/tenants tab 150 can include a list of end user, or "tenants" using one or more delivery groups. User portal interface 101*a* may also include a search feature that allows a user to search for server farms, by name, location, health status, or mode of operation.

In some embodiments, user portal interface 101*a* can also display an Edit Capacity button 160 allowing a user to increase or decrease the capacity of a server farm. User portal interface 101*a* can also display a Delete button 170 enabling a user to delete a server farm from the list of farms included in the Delivery Sites tab. User portal interface 101*a* also includes a Refresh button 180 which, when selected, can update delivery group information including: the data center, session machine catalog, mode of operation, capacity, domain, session machines, offerings, subscriptions, delivery sites, and tenants associated with a delivery group.

Figure 2A:
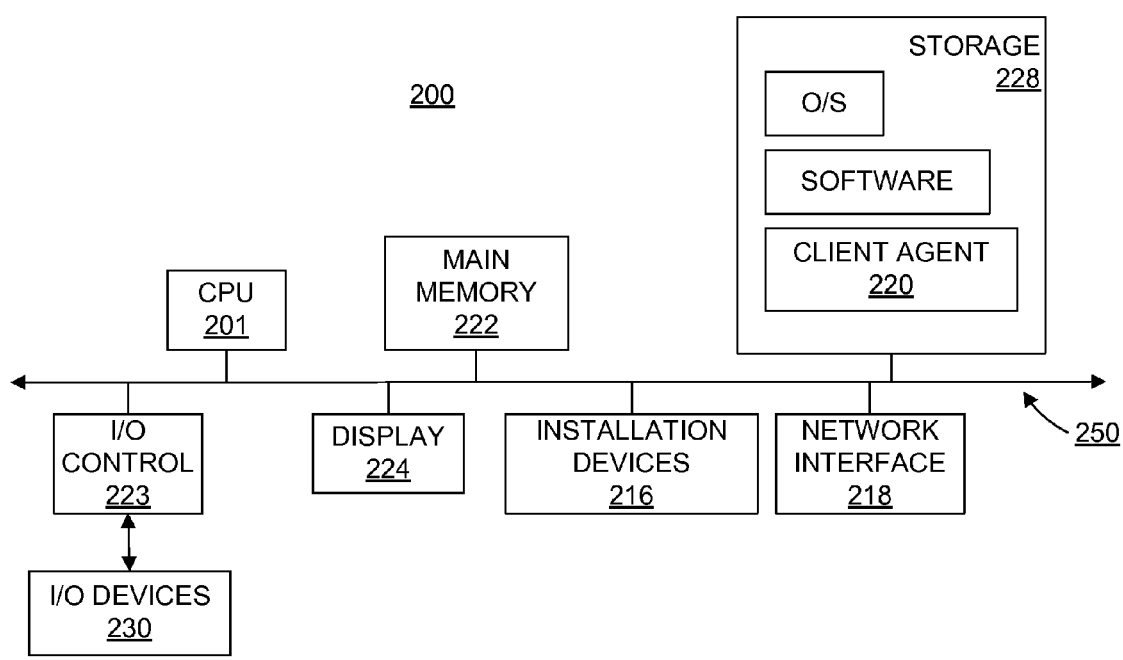
FIGS. 2A-2B show an exemplary computing device, consistent with the embodiments of the present disclosure.
Figure 2B:
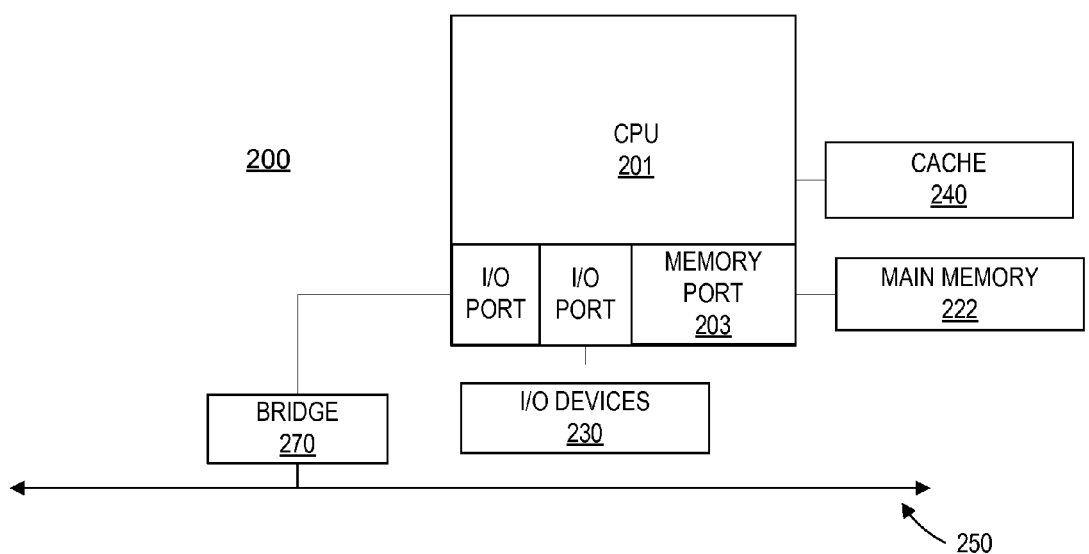

Configuration device 101 can be deployed as a standalone device, or may be a computer module executed on a computing device configured to perform functions related to methods disclosed herein. In some embodiments, the computing device may comprise a computer or networking device capable of communicating on any type and form of network described herein. Examples of such computing devices are illustrated in FIGS. 2A-2B. As shown in FIGS. 2A-2B, computing device 200 may include a central processing unit (CPU) 201 and a main memory 222. CPU 201 can be any logic circuitry that responds to and processes instructions fetched from the main memory 222. CPU 201 can be a single or multiple processors, microprocessors, field-programmable gate arrays (FPGAs), or digital signal processors (DSPs) capable of executing particular sets of instructions stored in a memory (e.g., main memory 222) or cache (e.g., cache 240). Main memory 222 may include a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. Main memory 222 may include one or more memory chips capable of storing data and allowing any storage location to be directly accessed by CPU 201. In some embodiments, main memory 222 can be any type of random access memory (RAM), or any other available memory chip capable of operating as described herein. In the exemplary embodiment shown in FIG. 2A, CPU 201 communicates with main memory 222 via a system bus 250. Computing device 200 can also include a visual display device 224 and one or more input/output (I/O) device 230 (e.g., a keyboard, mouse, or pointing device) connected through I/O controller 223, both of which communicate via system bus 250. Furthermore, I/O device 230 can also provide storage and/or an installation medium for the computing device 200.

As shown in FIG. 2A, computing device 200 can support one or more installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 CAN comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

FIG. 2B depicts an embodiment of an exemplary computing device 200 in which CPU 201 communicates directly with main memory 222 via a memory port 203. CPU 201 can communicate with a cache 240 via a secondary bus, sometimes referred to as a backside bus. In some other embodiments, CPU 201 can communicate with cache 240 via system bus 250. Cache 240 typically has a faster response time than main memory 222. In some embodiments, CPU 201 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

Figure 3:
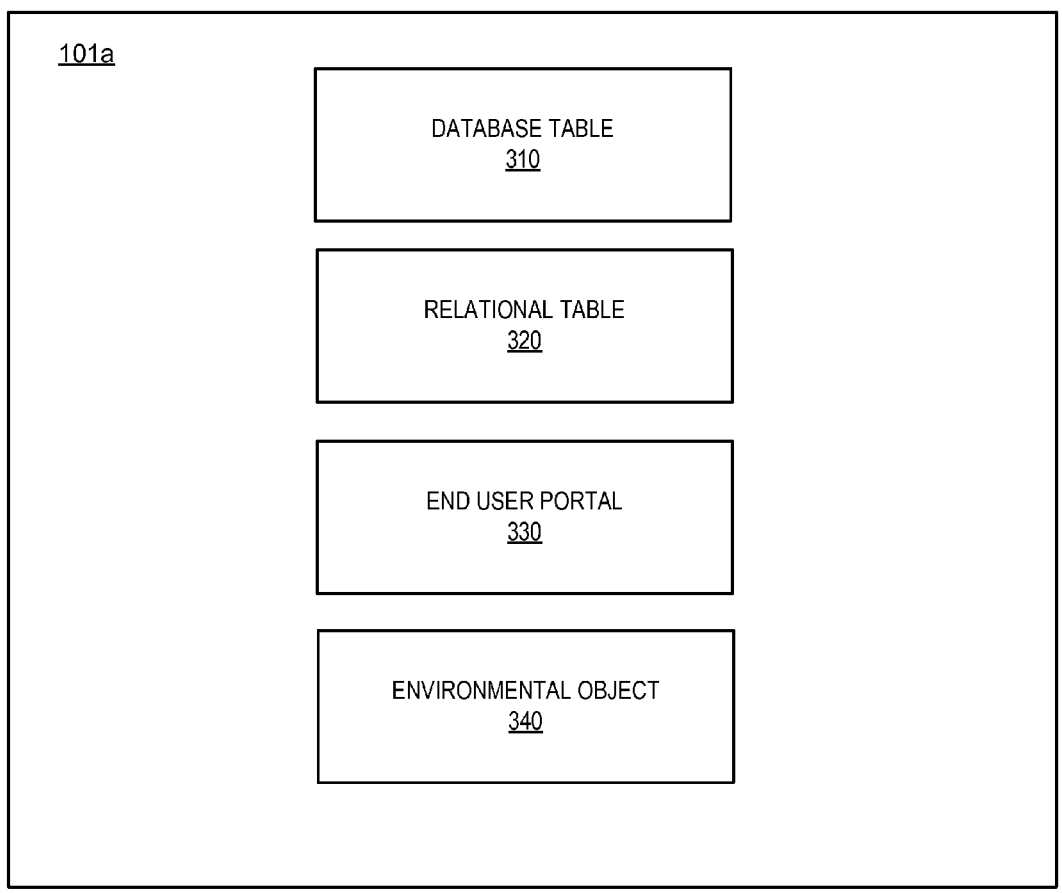
FIG. 3 is a block diagram of an exemplary user portal interface, consistent with embodiments of the present disclosure.

FIG. 3 is a block diagram of an exemplary user portal interface 101a, consistent with the embodiments of the present disclosure. In some embodiments, user portal interface 101a can include, among other things, database tables 310, relational tables 320, an end user portal 330, and an environmental objects 340. In some embodiments, user portal interface 101a may include one or more links for interfacing with database tables 310, relational tables 320, an end user portal 330, and environmental objects 340.

Database table 310 can be a database that contains information related to different objects in system 100, such as delivery groups and server farms. For example, database table 310 can provide one or more data structures showing the different delivery groups and server farms. In some embodiments, database table 310 can be implemented using a key-value pair or any other database schema.

Relational table 320 may comprise one or more data structures for tracking relationships between objects in system 100 (e.g., delivery groups and server farms). For example, relational table 320 can contain data describing the pairings or allocations between a single delivery group and one or more server farms or vice versa. For instance, one delivery group can be assigned to multiple server farms using a key-value pair or any other database schema.

In some embodiments, relational table 320 may store data for assigned workload details. The assigned workload details can contain, for example, one or more identifications of server farms and delivery groups, and a number (quantity) of machines a delivery group is expected to provide to a server farm. In some embodiments the assigned workload detail can also contain information identifying which machines in one or more delivery groups 107 are currently allocated to which server farm(s) 105.

End user portal 330 can be a program used to configure user programs and applications provided to a user. In some embodiments, end user portal 330 can be used by a network administrator to provide users with access to programs and applications offered by a server farm, on their personal and public devices (e.g., work desktop computer, home laptop computer, public computer, mobile device etc.). A network administrator can configure end user portal 330 to provide a user with a single consistent point of access to their desktop and applications from all of their devices.

Environmental object 340 can include objects either in software or hardware related to the computing environment (e.g., server farms and delivery groups). For example, environmental object 340 can be a software object or data structure (e.g., an icon or graphical representation displayed in end user portal 330) associated with a server farm 105, a delivery group 107, and/or any combination of server farms and/or delivery groups.

Figure 4:
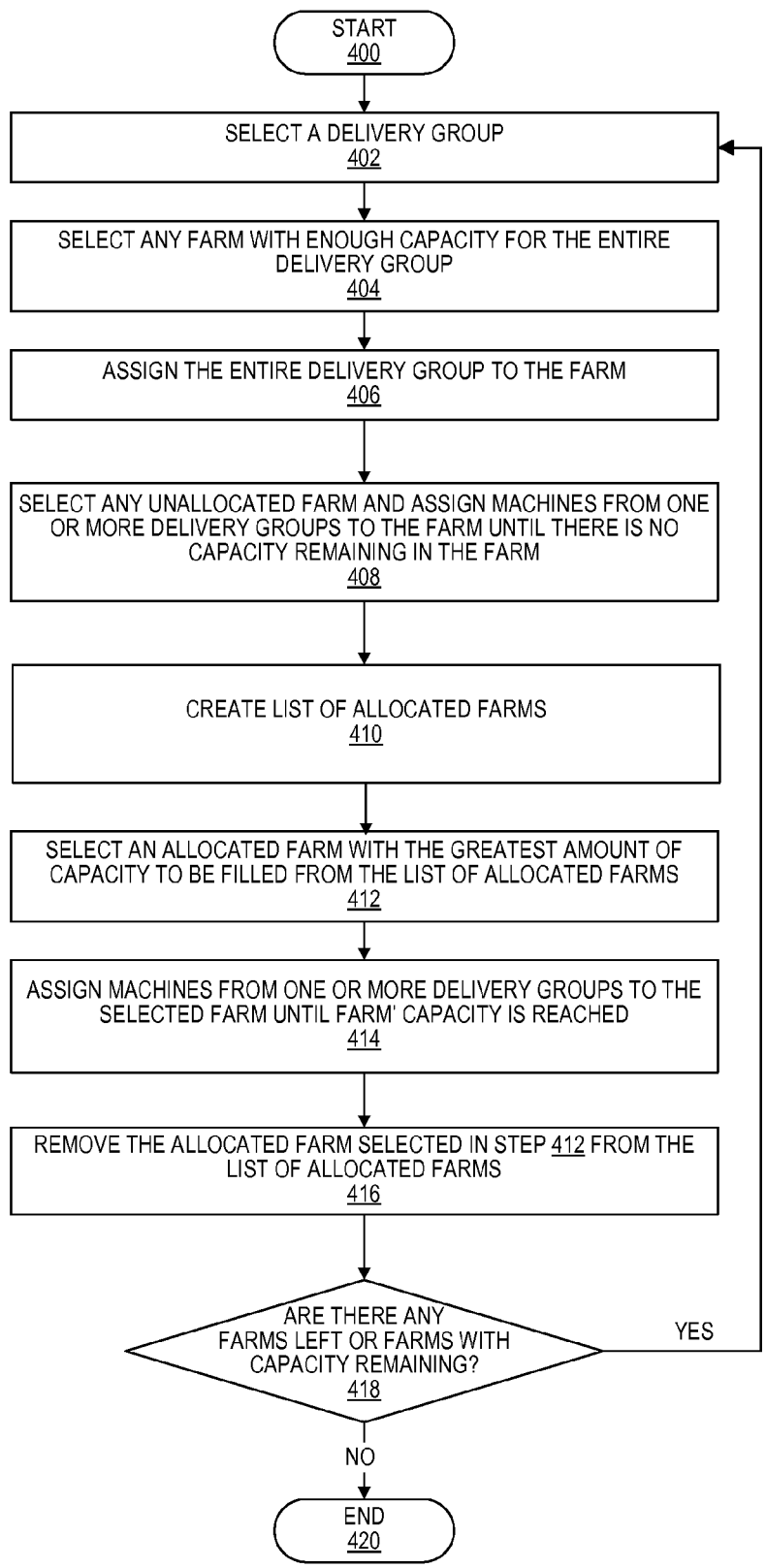
FIG. 4 is a flowchart representing exemplary methods for allocating delivery groups across multiple server farms, consistent with embodiments of the present disclosure.

FIG. 4 is a flowchart representing an exemplary method for allocating delivery groups across multiple server farms, consistent with embodiments of the present disclosure. It will be readily appreciated that the illustrated procedure can be altered to delete steps or further include additional steps. While the following description is directed to the method being performed by an orchestration system configuration device (e.g., configuration device 101), it is appreciated that the method can be performed in whole or in part by a device other than the configuration device 101. Moreover, in some embodiments, a user portal interface (e.g., user portal interface 101a) can provide an interface allowing the configuration device 101 to perform the method.

After initial start step (400), the configuration device 101 receives an input to select a delivery group (402). The input can include a request for a delivery group with a certain amount of capacity, such as a particular number of machines in a delivery group to be allocated to one or more server farms. In some embodiments, the input can include a request for a delivery group that belongs to a certain datacenter or domain, or delivery group operating in a certain mode (e.g., isolation mode).

In some embodiments, a delivery group can be selected based on the applications and programs needed by the users connected to a server farm. For example, an organization might be divided into multiple departments, each of which can require a unique set of programs and applications for the department employees. For instance, a marketing department may require spreadsheet programs, whereas a legal department may require word processing programs. Therefore in some embodiments a delivery group can be added to a server farm based on capacity as well as programs and applications required by a department connected to a server farm.

Configuration device 101 can receive an input to select a server farm with enough capacity to meet the capacity requirements of the delivery group (404), such as a server farm that can support some or all of the quantity of delivery group machines. The selected server farm can be a virtual server farm providing programs and applications to users who are connected to the server farm through different physical networks. In some embodiments, a server farm can provide access to users who belong to the same department within a company who are geographically dispersed, but logically grouped together by a server farm. Geographically dispersed users can, in some embodiments, communicate with a server farm using a WAN, MAN, or LAN, where different geographic regions can be characterized as: different continents; different regions of a continent; different countries; different states; different cities; different campuses; different rooms; or any combination of the preceding geographical locations.

After the server farm has been selected, the configuration device 101 can assign the entire delivery group to the selected server farm (406). In some embodiments, an entire delivery group can be assigned to multiple server farms. For example, a delivery group can be divided according to the applications and programs running on the machines within a delivery group, and assigned to different server farms based on the requirements of users connected to a server farm. For instance, an organization might assign different departments to different server farms and the machines in a delivery group can be assigned to server farms associated with a department based on the applications and programs required by users in a department. Therefore, a delivery group can span multiple server farms depending on the requirements of a tenant (i.e. multidepartment organization).

In some embodiments, steps 402-406 may stand alone. For example, if the entire selected delivery group is assigned to a single server farm, the method may end after completing step 406 if no additional delivery groups are to be deallocated.

After the delivery group has been assigned to the server farm, the configuration device 101 can select any unallocated server farm that has capacity, and can assign machines from one or more delivery groups to the farm until there is no more capacity remaining in the server farm (408). As described above, in some embodiments, if a server farm is assigned to a specific set of users (e.g., marketing department), machines from different delivery groups can be assigned to the server farm, depending on the applications and programs required by users in the department until the capacity of the server farm has been filled.

In step 410, the configuration device 101 creates a list of partially allocated server farms, such as server farms 105 whose capacity has been partially filled. Configuration device 101 can select the allocated farm with the greatest amount of capacity to be filled from the list (412). In some embodiments, the list can contain multiple server farms with the same capacity. In some instances, configuration device 101 can create lists of server farms by prioritizing server farms according to applications or programs required by users using a server farm, Quality of Service requirements of a tenant, a number of users requesting access to applications and/or programs, a number of users requesting access to certain types of applications and/or programs, and/or a set of link metrics. The set of link metrics can include, but are not limited to, latency or jitter experienced by a packet as it traverses a link, a number of link segments a packet is expected to traverse, an average number of link segments a packet traverses, an expected end-to-end delay, an average end-to-end delay, throughput, department security requirements, or any other network administrator defined metrics. For example, if two server farms have the same capacity and one server farm is hosting a set of communication applications (e.g., VoIP, instant messaging applications, video conferencing applications, or other multimedia applications) requiring a greater Quality of Service and lower end-to-end delays than a server farm hosting an office suite (e.g., word processor, spreadsheet, presentation program, etc.), then the server farm hosting the communication applications will be selected first.

After a server farm 105 is selected from the partially allocated server farm list, in step 414 configuration device 101 assigns machines from one or more delivery groups to the selected farm, until the capacity of the selected server farm has been met. In some embodiments, an entire delivery group can be assigned to a single partially allocated server farm, or a portion of a delivery group can be assigned to fill the remaining capacity in the partially allocated a server farm. As explained above, a delivery group can be divided according to the applications and/or programs running on the machines within a delivery group and assigned to different server farms based on the applications and programs required by the users connected to the server farm, or based on one or more link metrics or other rules established by a network administrator.

In some embodiments, server farm selection (412) can be parallelized using one or more processors, and configuration device 101 can assign delivery groups to multiple server farms simultaneously without prioritizing server farms and assigning delivery groups sequentially to server farms, as described above in step 412.

After the capacity of an allocated server farm has been fulfilled, in step 416 configuration device 101 removes the allocated server farm from the list of allocated farms (416). The method can proceed to step 418 and search for other server farms with full capacity, or server farms with partial capacity. If there are server farms with full or partial capacity, the method returns to step 402 and configuration device 101 selects another delivery group. If, however there are no remaining server farms with available capacity, the method can end (420).

In some embodiments, steps 402 and 408-416 may stand alone. For example, if the delivery group selected in step 402 is spanned across multiple server farms, then the method may perform steps 408-416, and end.

Figure 5:
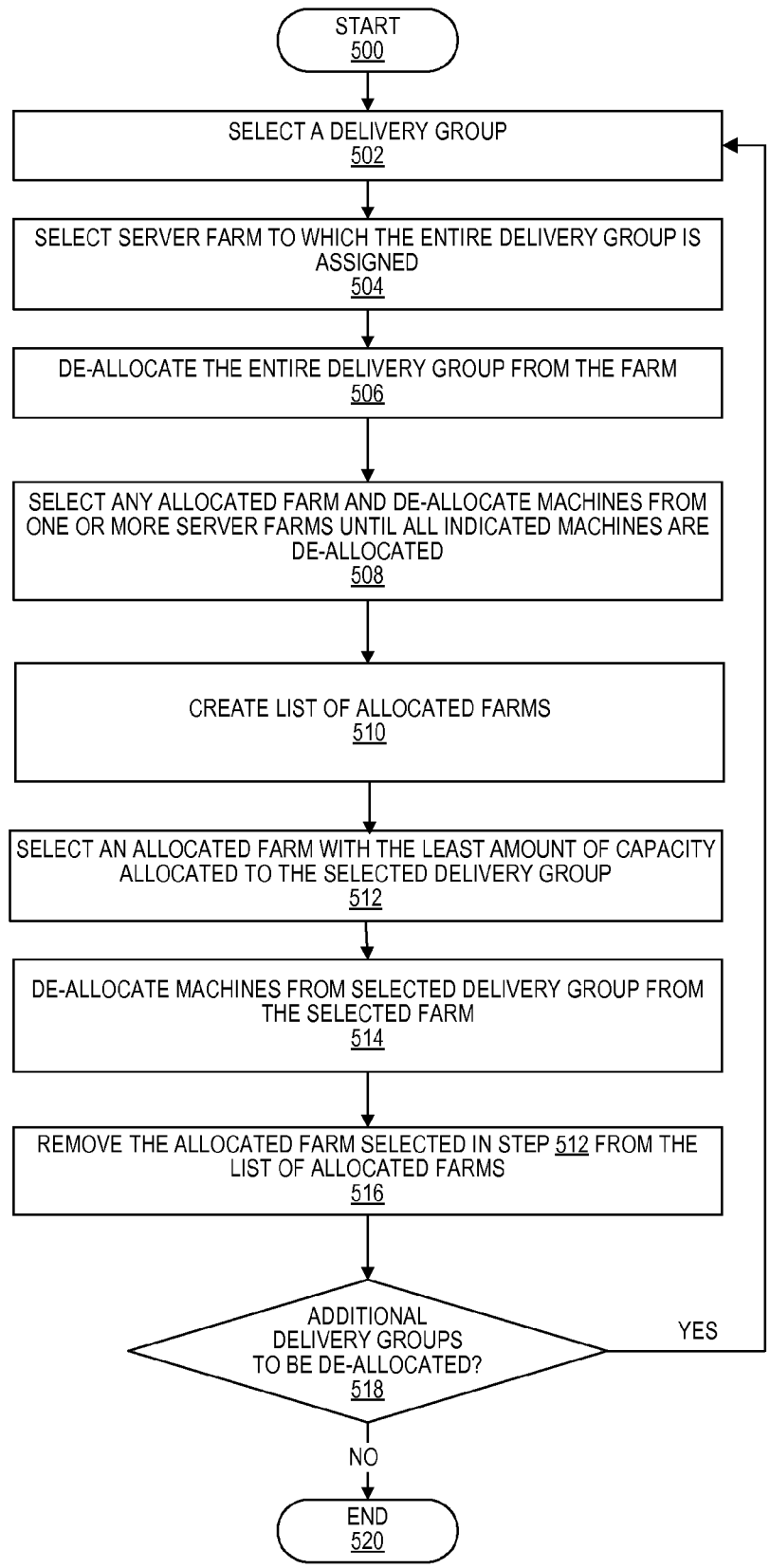
FIG. 5 is a flowchart representing an exemplary method for de-allocating delivery groups across multiple server farms, consistent with embodiments of the present disclosure.

FIG. 5 is a flowchart representing an exemplary method for de-allocating delivery groups from one or more server farms, consistent with embodiments of the present disclosure. It will be readily appreciated the illustrated procedure can be altered to delete steps or further include additional steps. While the following description is directed to the method being performed by an orchestration system configuration device (e.g., configuration device 101), it is appreciated that the method can be performed in whole or in part by a device other than configuration device 101. Moreover, in some embodiments, a user portal interface (e.g., user portal interface 101*a*) can provide an interface allowing configuration device 101 to perform the method.

After initial start step (500), in step 502 configuration device 101 receives an input to select a delivery group. In some embodiments, configuration device 101 may receive the input via user portal interface 101*a*. The input can include a request to reduce the allocated capacity of a server farm or to remove one or more server farms. In some embodiments, the input can include a request for a delivery group that belongs to a certain datacenter or domain, or delivery group operating in a certain mode (e.g., isolation mode).

In some embodiments, a delivery group can be selected based on the applications and programs needed by the users connected to a server farm. For example, an organization might be divided into departments each of which requires a unique set of programs and applications for the employees in that department. For instance a company might have a marketing department that uses spreadsheet programs, and a legal department that uses word processing programs. Therefore in some embodiments a delivery group can be removed from a selected server farm based on the allocated server farm capacity as well as the programs and applications required by users in a department connected to the server farm.

In some embodiments, configuration device 101 can receive an input to select a server farm to which the entire delivery group is allocated (504), if the entire delivery group was previously allocated to a single server farm. The selected server farm can be a virtual server farm providing programs and applications to users, who are connected to the server farm through different physically networks. For example, a server farm can provide access to users who belong to the same department within a company who are geographically dispersed, but logically grouped together by a server farm. Geographically dispersed users can, in some embodiments, communicate with the server farm using a WAN, MAN, or LAN, where different geographic regions can be characterized as: different continents; different regions of a continent; different countries; different states; different cities; different campuses; different rooms; or any combination of the preceding geographical locations.

After the server farm has been selected, configuration device 101 can un-assign (de-allocate) the entire quantity of delivery group machines from the server farm (506), and in some embodiments effectively remove the delivery group machines from service entirely. In some embodiments the entire delivery group might not be assigned to a single server farm. For example, a delivery group can be divided according to the applications and programs running on the machines within a delivery group and assigned to different server farms based on the requirements of the users connected to a server farm. For instance, an organization might assign different departments to different server farms and the machines in a delivery group can be assigned to server farms associated with a department based on the applications and programs required by users in a department. Therefore, a delivery group can span multiple server farms depending on the requirements of a tenant, and depending on the quantity of delivery group machines to de-allocate, multiple server farms may require selection for de-allocation.

In some embodiments, steps 502-506 may stand alone. For example, if the entire selected delivery group is assigned to a single server farm, the method may end after completing step 506 if no additional delivery groups are to be de-allocated.

In some embodiments where delivery group to be de-allocated are spanned across multiple server farms, configuration device 101 can select one or more allocated server farms that have a capacity (e.g. quantity of machines) currently allocated from the selected delivery group, and can de-allocate machines from one or more server farms until the indicated quantity of delivery group machines are all de-allocated (508). As described above, in some embodiments, if a delivery group is across multiple server farms, machines can be de-allocated from one or more of the server farms until the entire capacity (quantity of machines) identified in step 502 are de-allocated.

In step 510, configuration device 101 creates a list of allocated server farms containing server farms whose capacity has been partially filled with one or more machines from the selected delivery group. The list may be ordered from the least amount of allocated capacity from the delivery group, to the highest amount of allocated capacity from the delivery group. For example, if a selected delivery group has 12 machines allocated among server farms A, B, and C in the quantities/capacities of 5 machines, 3 machines, and 4 machines, respectively, then the created list may be ordered B, C, A.

In step 512, configuration device 101 can select a first server farm from the created list, such as an allocated server farm with the least amount of capacity allocated from the selected delivery group. In some embodiments, the list can contain multiple server farms with equal allocated capacities. In some instances, configuration device 101 can create lists of server farms by prioritizing server farms according to applications or programs required by users using a server farm, Quality of Service requirements of a tenant, a number of users requesting access to applications and/or programs, a number of users requesting access to certain types of applications and/or programs, and/or a set of link metrics. The set of link metrics can include but are not limited to, latency or jitter experienced by a packet as it traverses a link, a number of link segments a packet is expected to traverse, an average number of link segments a packet traverses, an expected end-to-end delay, an average end-to-end delay, throughput, department security requirements, or any other network administrator defined metrics. For example, if two server farms have the same allocated capacity and one server farm is hosting a set of communication applications (e.g., VoIP, instant messaging applications, video conferencing applications, or other multimedia applications) requiring a greater Quality of Service and lower end-to-end delays than a server farm hosting an office suite (e.g., word processor, spreadsheet, presentation program, etc.), then in some embodiments the server farm hosting the office suite can be selected first.

After an allocated server farm has been selected, in step 514 configuration device 101 de-allocates one or more machines from selected delivery group from the selected server farm, until the identified capacity is completely de-allocated, or until all machines of the selected delivery group assigned to the selected server farm are de-allocated. In some embodiments, an entire delivery group can be de-allocated from a single server farm, or a portion of a delivery group can de-allocated from the selected server farm. As explained above, a delivery group can be divided according to the applications and/or programs running on the machines within a delivery group and assigned to different server farms based on the applications and programs required by the users connected to the server farm, or any other metrics or rules established by a network administrator.

In some embodiments, the selecting of a farm in step 512 can be parallelized using one or more processors, and configuration device 101 can de-allocate machines of the selected delivery group from multiple server farms simultaneously without prioritizing server farms and sequentially de-allocating delivery group machines from server farms, as described above in step 512.

After the delivery group machines are de-allocated from the selected server farm, in step 516 configuration device 101 removes the allocated server farm from the list of allocated farms. The method can proceed to step 518 and to determine if additional delivery groups are to be de-allocated from one or more server farms. If there are more allocated server farms with full or partial capacities allocated to additional the selected delivery group, the method returns to step 502 and configuration device 101 selects another delivery group for de-allocation. If, however there are no farms with capacity the method can end (520).

In some embodiments, steps 502 and 508-516 may stand alone. For example, if the delivery group selected in step 502 is spanned across multiple server farms, then the method may perform steps 508-516, and end.

While FIGS. 4-5 focus on a single list of server farms, it is appreciated that more than one list can be maintained by configuration device 101. In some embodiments, configuration device 101 can maintain multiple lists, each of which maintains a list of server farms. For example, configuration device 101 can maintain different lists of server farms corresponding to different metrics in addition to capacity requirements. For instance, a list can be created based on capacity as well as other metrics such as the average latency experienced by a packet on a connection. Alternatively a list can be created and based on the capacity and average inter-arrival time of packets on a connection.

The methods disclosed herein can be implemented as a computer program product comprising computer-readable instructions. Computer-readable instructions can be stored on a tangible non-transitory computer-readable medium, such as a flexible disk, a hard disk, a CD-ROM (compact disk-read only memory), an MO (magneto-optical) disk, a DVD-ROM (digital versatile disk-read only memory), a DVD RAM (digital versatile disk-random access memory), or a semiconductor memory. Alternatively, the methods can be implemented in hardware components or combinations of hardware and software of a data processing apparatus, e.g., a programmable processor, a computer, or multiple computers. The computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

In the preceding specification, the embodiments have been described with reference to specific exemplary embodiments. It will however, be evident that various modifications and changes can be made without departing from the broader spirit and scope of the exemplary embodiments as set forth in the claims that follow. The specification and drawings are accordingly to be regarded as illustrative rather than restrictive sense. Other embodiments of the present disclosure may be apparent to those skilled in the art from consideration of the specification and practice of the invention disclosed herein.

What is claimed is:

1. A device, comprising:
   one or more data storage devices configured to store one or more mappings between one or more delivery groups and a plurality of virtual server farms including a first virtual server farm and a second virtual server farm, wherein each virtual server farm of the plurality of virtual server farms is configured to provide a desktop virtualization environment to a respective group of users, and wherein each delivery group is a group of machines for supporting applications and programs requested by a user connected to a virtual server farm;
   one or more processors configured to execute instructions causing the device to:
      select a delivery group having a plurality of machines;
      select the first virtual server farm and the second virtual server farm for assigning the plurality of machines of the delivery group;
      assign a quantity of machines of the delivery group in accordance with the following operations:
         if a first virtual server farm has a capacity to support a number of machines that is equal to or greater than a number of machines of the selected delivery group, assign the quantity of machines of the delivery group to the first virtual server farm, and
         if the first virtual server farm has a capacity to support a number of machines that is less than the number of machines of the selected delivery group, perform the following operations:
            (a) assign first machines of the quantity of machines to the first virtual server farm until the first virtual server farm's capacity is reached, where the first machines comprise those machines of the quantity of machines running software needed by users connected to the first virtual server farm; and
            (b) assign any remaining first machines and second machines of the quantity of machines to the second virtual server farm.

2. The device of claim 1, wherein the quantity of machines include one or more virtual machines or physical machines.

3. The device of claim 1, wherein the assignment of the quantity of machines of the delivery group to the first virtual server farm comprises the identification of available machines in the delivery group to allocate to the first virtual server farm.

4. The device of claim 1, wherein the second virtual server farm comprises a virtual server farm having a greatest available capacity of the plurality of virtual server farms other than the first virtual server farm.

5. The device of claim 1, wherein the second virtual server farm comprises a virtual server farm having a least available capacity of the plurality of virtual server farms other than the first virtual server farm.

6. The device of claim 1, wherein the one or more processors are configured to execute further instructions causing the device to:
   select a third virtual server farm from the plurality of virtual server farms when the second virtual server farm is incapable of supporting the second machines that is less than a quantity of the second machines of the selected delivery group;
   assign a portion of the second machines to the second virtual server farm; and
   assign a portion of the second machines of the delivery group to the third virtual server farm.

7. The device of claim 1, wherein the plurality of machines of the selected delivery group is a collection of machines supporting user requests received by a virtual server farm assigned to the plurality of machines.

8. A method performed by a device configured to allocate machines of a delivery group to a plurality of virtual server farms including a first virtual server farm and a second virtual server farm, wherein each virtual server farm is configured to provide a desktop virtualization environment to a respective group of users, and wherein each delivery group is a group of machines for supporting applications and programs requested by a user connected to a virtual server farm, the method comprising:
   selecting a delivery group having a quantity of machines;
   selecting a first virtual server farm for assigning the quantity of machines of the delivery group;
   assigning the quantity of machines of the delivery group, the assigning comprising:
      in response to the first virtual server farm having a capacity to support a quantity of machines that is equal to or greater than the quantity of machines of the selected delivery group, assigning the quantity of machines of the delivery group to the first virtual server farm; and
      in response to the first virtual server farm having a capacity to support a quantity of machines that is less than the number of machines of the selected delivery group,
         assigning first machines of the quantity of machines to the first virtual server farm until the first virtual server farm's capacity is reached, where the first machines comprise those machines of the quantity of machines running software needed by users connected to the first virtual server farm, and
         assigning any remaining first machines and second machines of the quantity of machines to a second virtual server farm.

9. The method of claim 8, wherein the quantity of machines include one or more virtual machines or physical machines.

10. The method of claim 8 wherein selecting the delivery group comprises receiving an identity of the delivery group from a database.

11. The method of claim 8 wherein selecting the first virtual server farm involves receiving an identity of the first virtual server farm from a database.

12. The method of claim 8 wherein assigning the quantity of machines of the delivery group to the first virtual server farm comprises identifying available machines in the delivery group to allocate to the first virtual server farm.

13. The method of claim 8, wherein the second virtual server farm comprises a virtual server farm having a greatest available capacity of the plurality of virtual server farms other than the first virtual server farm.

14. The method of claim 8, wherein the second virtual server farm comprises a virtual server farm having a least available capacity of the plurality of virtual server farms other than the first virtual server farm.

15. The method of claim 8, further comprising:
selecting a third virtual server farm from the plurality of virtual server farms when the second virtual server farm is incapable of supporting the second machines that is less than a quantity of the second machines of the selected delivery group;
assigning a portion of the second machines to the second virtual server farm; and
assigning a portion of the second machines of the delivery group to the third virtual server farm.

16. A device, comprising:
one or more memories having stored thereon data identifying a first virtual server farm and a second virtual server farm, the data further comprising:
    a first mapping for assigning first machines of a delivery group to the first virtual server farm until the first virtual server farm's capacity is reached, where the first machines comprise those machines of a quantity of machines needed by users connected to the first virtual server farm; and
    a second mapping for assigning any remaining first machines and second machines of the delivery group to the second virtual server farm;
wherein the first virtual server farm and the second virtual server farm are configured to provide a desktop virtualization environment to a respective group of users; and
wherein the first set of machines and the second set of machines support applications and programs requested by a user connected to the first virtual server farm and the second virtual server farm.

17. A non-transitory computer readable storage medium storing a set of instructions that is executable by one or more processors of a device to cause the device to perform a method to allocate machines of a delivery group to a plurality of virtual server farms including a first virtual server farm and a second virtual server farm, wherein each virtual server farm is configured to provide a desktop virtualization environment to a respective group of users, and wherein each delivery group is a group of machines configured for supporting applications and programs requested by a user connected to a virtual server farm, the method comprising:
selecting a delivery group having a quantity of machines;
selecting, from a plurality of virtual server farms, a first virtual server farms for assigning the quantity of machines;
assigning the quantity of machines of the delivery group, the assigning comprising:
    if the first virtual server farm has a capacity to support a number of machines that is equal to or greater than the number of machines of the selected delivery group, assigning the quantity of machines of the delivery group to the first virtual server farm, and
    if the first virtual server farm supports a number of machines that is less than the number of machines of the selected delivery group,
        (a) assigning first machines of the delivery group to the first virtual server farm until the first virtual server farm's capacity is reached, where the first machines comprise those machines of the quantity of machines running software needed by users connected to the first virtual server, and
        (b) assigning any remaining first machines and second machines of the delivery group to a second virtual server farm.

18. The non-transitory computer readable storage medium of claim 17, wherein assigning the quantity of machines of the delivery group to the first virtual server farm comprises identifying available machines in the delivery group to allocate to the first virtual server farm.

19. The non-transitory computer readable storage medium of claim 17, wherein the second virtual server farm comprises a virtual server farm having:
a greatest available capacity of the plurality of virtual server farms other than the first virtual server farm, or
a least available capacity of the plurality of virtual server farms other than the first virtual server farm.

20. The non-transitory computer readable storage medium of claim 17, wherein the set of instructions that is executable by one or more processors of the device to cause the device to further perform:
selecting a third virtual server farm from the plurality of virtual server farms when the second virtual server farm is incapable of supporting the second machines that is less than a quantity of the second machines of the selected delivery group;
assigning a portion of the second machines to the second virtual server farm; and
assigning a portion of the second machines of the delivery group to the third virtual server farm.

* * * * *